United States Patent [19]
Aoki

[11] Patent Number: 5,920,527
[45] Date of Patent: Jul. 6, 1999

[54] APPARATUS AND METHOD FOR ACCESSING MULTIPLE RECORDING LAYERS OF A DISK

[75] Inventor: Nobuyuki Aoki, Kanagawa, Japan

[73] Assignee: Sony Corporation, Tokyo, Japan

[21] Appl. No.: 08/957,950

[22] Filed: Oct. 27, 1997

[30] Foreign Application Priority Data

Oct. 29, 1996 [JP] Japan .................................. 8-286387

[51] Int. Cl.⁶ .................................................. G11B 17/22
[52] U.S. Cl. ................................................. 369/32; 369/94
[58] Field of Search .......................... 369/32, 94, 275.1, 369/50, 54, 58

[56] References Cited

U.S. PATENT DOCUMENTS

| | | | |
|---|---|---|---|
| 4,450,553 | 5/1984 | Holster et al. | 369/94 |
| 5,373,499 | 12/1994 | Imaino et al. | 369/94 |
| 5,485,452 | 1/1996 | Maeda | 369/284 |
| 5,499,231 | 3/1996 | Fennema et al. | 369/94 |
| 5,586,107 | 12/1996 | Best et al. | 369/275.1 |
| 5,696,743 | 12/1997 | Kawasaki | 369/32 |

*Primary Examiner*—Tan Dinh
*Attorney, Agent, or Firm*—Frommer Lawrence & Haug, LLP.; William S. Frommer

[57] ABSTRACT

When reproducing a disk having a plurality of recording layers read from one face, the reading out position is refocused from the current track position in a current recording layer to the target track position in the target recording layer. The reading out position deviates appreciably during such refocusing of the reading out position, and spurt processing is performed as a result. To avoid lengthy spurt processing, the reading out position is first moved from a first recording layer to a second recording layer in which is recorded the data to be read next. Thereafter, the reading out position is moved along the second recording layer to a position where such data is located, thereby avoiding additional spurt processing.

22 Claims, 10 Drawing Sheets

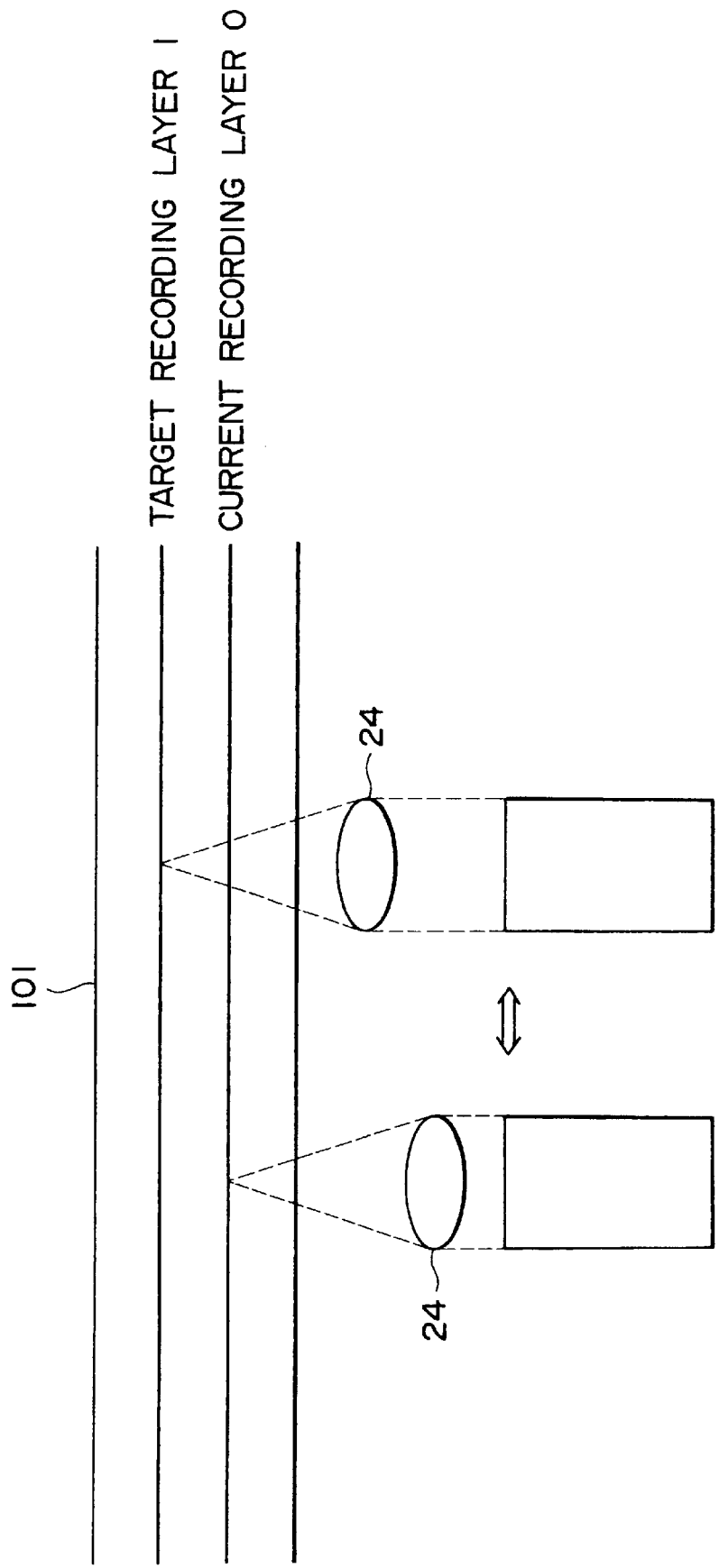

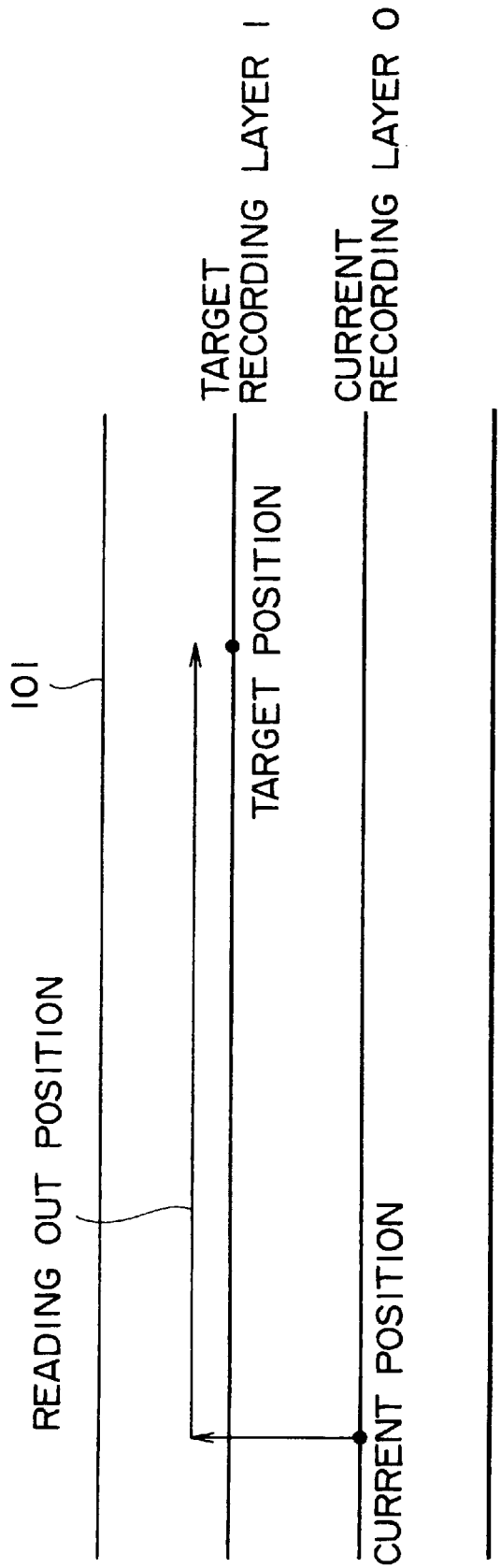

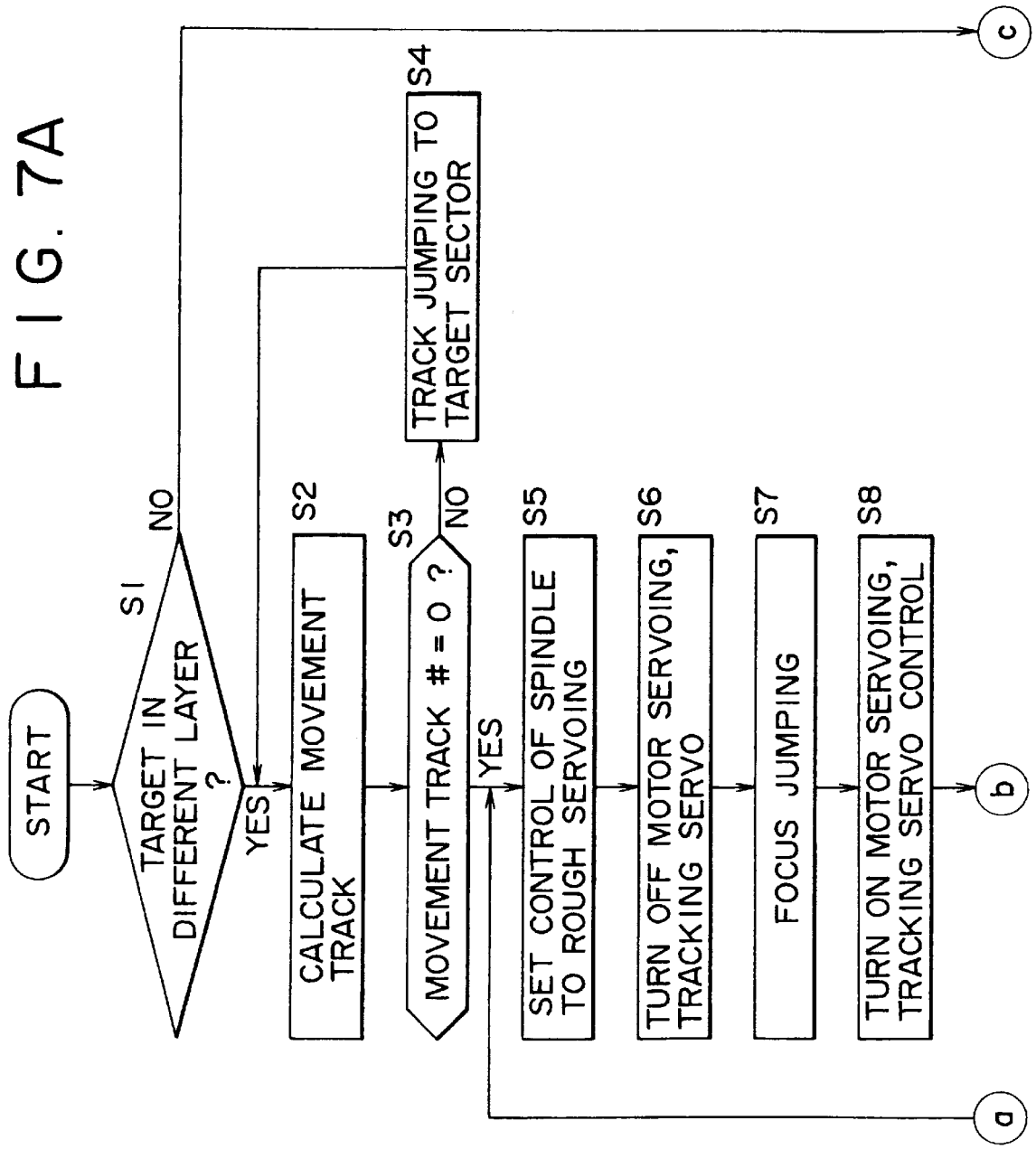

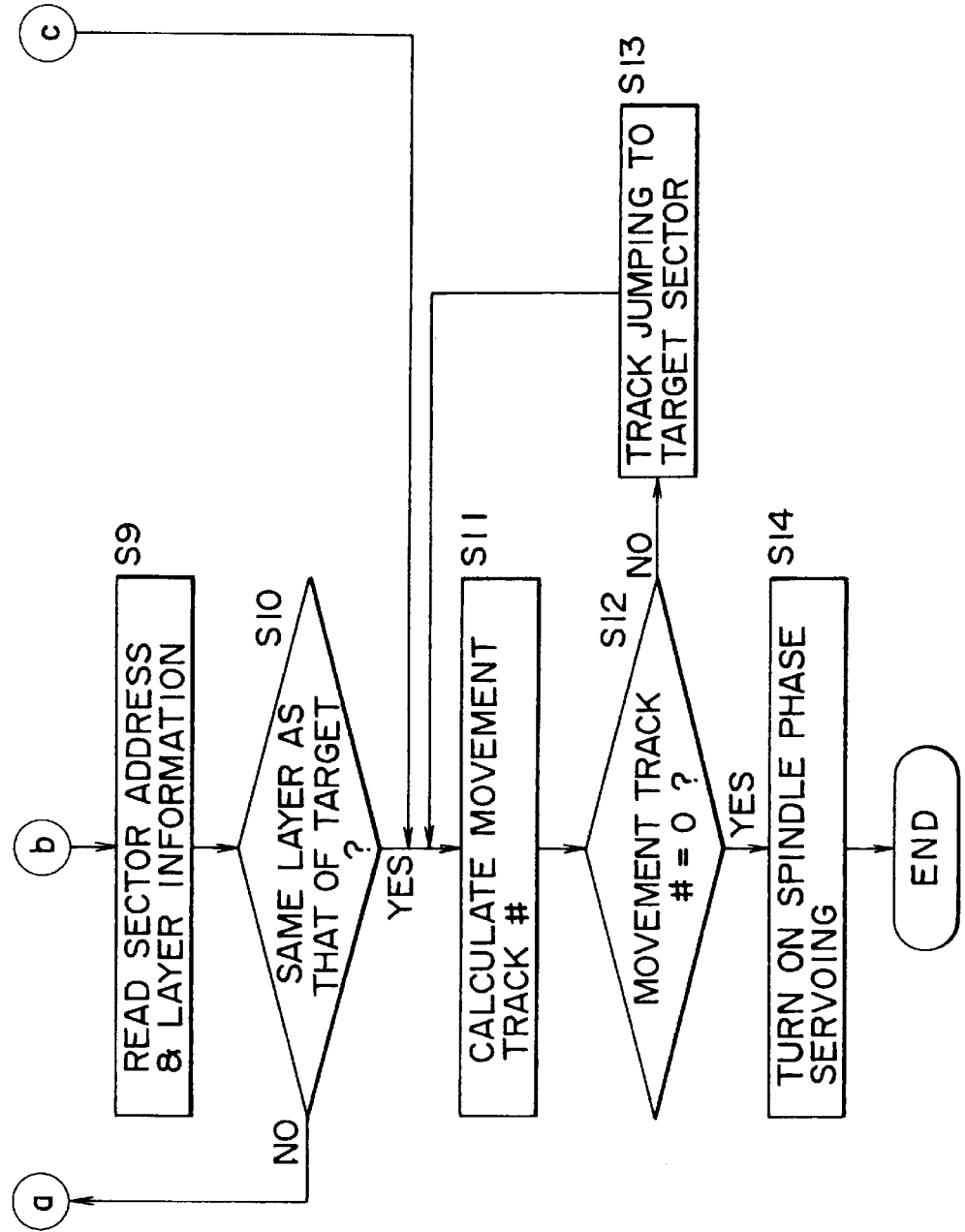

APPARATUS AND METHOD FOR ACCESSING MULTIPLE RECORDING LAYERS OF A DISK

BACKGROUND OF THE INVENTION

1. Field of the Invention

This invention relates to a reproducing apparatus and method, and more particularly to a reproducing apparatus and method for reproducing an optical disk on which a plurality of recording layers of data recorded thereon are read from one face.

2. Description of the Related Art

Optical disks such as compact disks on which data are optically recorded have met with great success and consequently are now widely distributed. The success of such optical disks is due in part to their ability to store large amounts of data in sectors arranged in circumferential tracks.

Recently, a DVD (Digital Versatile Disk) has been developed which is an optical disk having an even larger capacity than its predecessor. The single layer DVD, which was originally proposed, has a single recording layer much like the compact disk. More recently, there has been proposed a dual layer DVD which has two recording layers readable from one face thereof. Such a dual layer DVD, which is capable of storing twice the data, need not be manually turned over since the data is reproduced from the same face.

When reproducing data from any of the optical disks described above, an optical pickup irradiates laser light upon pits etched along the circumferential tracks of a recording layer. The laser light reflected from the pits, which are shaped corresponding to different types of data, is photo-electrically converted by the optical pickup into a signal representing that data.

In the case of reading data from the single layer DVD, the optical pickup is moved by a motor in a radial direction to the optical disk from a current track to a target track. More particularly, a control circuit calculates, from a current sector address of a current reading out position and a next sector address of the next sector to be read, the number of tracks (movement track number) which the optical pickup must be moved, or "track jumped", to read the next sector. The control circuit then causes the motor to track jump the optical pickup by the movement track number.

In the case of reading data from a dual layer DVD, there has been no commercially adopted method heretofore used for reading from different layers. A method proposed by Applicants of the present invention is described with reference to the flow chart of FIG. 7.

Initially, it is determined whether the optical pickup must be refocused to a different layer. Thus, it is discriminated in step S1 from the target sector address St of the next sector to be read and the current sector address Sc of the current sector that the next sector is in a different recording layer than the current recording layer.

Then, in steps S2–S4, "spurt processing" is commenced, wherein the pickup is track jumped along the current layer to a track position parallel, or normal, to the target position in the target recording layer. In step S2, the number of tracks over which the reading out position of the optical pickup must be moved (movement track number) is calculated from the target sector address St and the current sector address Sc. It is discriminated in step S3 whether the movement track number is 0 which means that the current reading out position is already aligned with the target track. Otherwise, the reading out position of the optical pickup is track jumped in step S4 the number of tracks indicated by the movement track number. Whereupon, steps S2 to S4 are repeated until the movement track number is equal to 0.

At this time, the optical pickup is aligned with the target track. But before refocusing the optical pickup to the target layer, servoing must be halted since the optical pickup is not focused on a track during refocusing. To explain, servoing actively controls the speed set by the spindle motor of the optical disk in synchronization with a sampling rate of the optical pickup, the position of the optical pickup set by the motor, and tracking of the optical pickup to the disk. It would be meaningless to perform such servoing when the optical pickup is not focused on a recording layer.

Hence, in step S5, the spindle motor which rotates the optical disk is set to rough servoing, whereby the speed of the rotating optical disk is set to a fixed linear velocity. In step S6, both the servoing control of the motor for moving the optical pickup in a radial direction of the optical disk and the tracking servo control of the optical pickup are halted.

While servoing is halted, the optical pickup is refocused to the target recording layer. More particularly, the distance between the objective lens of the pickup and the target layer optical disk is changed in step S7, thereby refocusing the pickup to the target recording layer Then, when the optical pickup is focused on the target recording layer, servoing control of the motor is resumed, and the optical disk is rotated with a linear velocity in synchronization with a sampling rate of the optical pickup. Further, tracking servo control is resumed, thereby tracking the optical pickup to the disk.

As a measure to check whether the optical pickup is focused on the target layer, the sector address and the layer information are read out from the optical disk in step S9. Then in step S10, it is discriminated from the layer information whether the recording layer being currently read includes the target sector. If this is not the case, control returns to step S5 where the refocusing procedure in steps S5 to S10 is repeated until the read out position is set to the target recording layer. Control then advances to steps S11 to S13. It is seen that control advances directly to steps S11 to S13 when it is determined in step S1 that the optical pickup does not need to be refocused to a different layer.

Since servoing is halted during refocusing, the track position of the optical pickup may have drifted appreciably. Thus, in steps S11 to S13, spurt processing is again commenced. Thus, the movement track number is calculated in step S11 from the target sector address St and the current sector address Sc. In step S12, it is discriminated whether the movement track number is 0 which means that the optical pickup tracks the target track. Otherwise, the optical pickup must be track jumped by the movement track number as directed by step S13. Control then returns to steps S11 to S13 until the movement track number is 0.

At this time, the optical pickup tracks the target track in the target recording layer, and control advances to step S14 where servo control of the phase of the spindle motor is resumed and control ends.

The movement of the optical disk from the current recording layer to the target recording layer is illustrated in FIG. 8 wherein the reading out position is first moved according to spurt processing (steps S2 to S4) from the current position in the current recording layer (0) toward the target position. Then, the optical disk is refocused from the current recording layer (0) to the target recording layer (1) (steps S5 to S10).

Since the optical pickup may deviate appreciably from the target sector after refocusing in steps S5 to S10 because servoing was halted, spurt processing should be performed a second time in steps S11 to S13. Thus, much time is required for moving the optical pickup to a different recording layer when reproducing a dual layer DVD.

OBJECTS AND SUMMARY OF THE INVENTION

The present invention has been made in view of such circumstances as described above and makes it possible to perform movement of a reading out position of the optical pickup to a different recording layer quickly.

It is an object of the present invention to reproduce data from a disk on which a plurality of recording layers of data recorded thereon are read from one face.

It is another object of the present invention to quickly move the reading out position from the current track in the current recording layer of a disk to the target track in the target recording layer.

It is still another object of the present invention to quickly move the reading out position between the current and target tracks of a disk while avoiding performing spurt processing more than once.

According to one aspect of the invention, a reproducing method and apparatus are provided for reproducing data from a disk on which a plurality of recording layers of data recorded thereon are read from one face. Data recorded in a first recording layer of the disk is read from a reading out position. The reading out position is then moved from the first recording layer to a second recording layer having data to be read next. Thereafter, the reading out position is moved along the second recording layer to a position where the data is to be read next. With this invention, spurt processing need only be performed once, thereby moving the reading out position of the optical pickup to a different recording layer quickly.

BRIEF DESCRIPTION OF THE DRAWINGS

The following detailed description, given by way of example and not intended to limit the present invention solely thereto, will best be appreciated in conjunction with the accompanying drawings, wherein like referenced numerals denote like elements and parts, in which:

FIG. 4 illustrates the operation of the optical pickup according to the present invention;

FIG. 5 illustrates the movement of the optical pickup according to the present invention;

FIG. 7 is a flowchart of the previously proposed operation of an optical pickup.

DETAILED DESCRIPTION OF THE PREFERRED EMBODIMENTS

Figure 1:
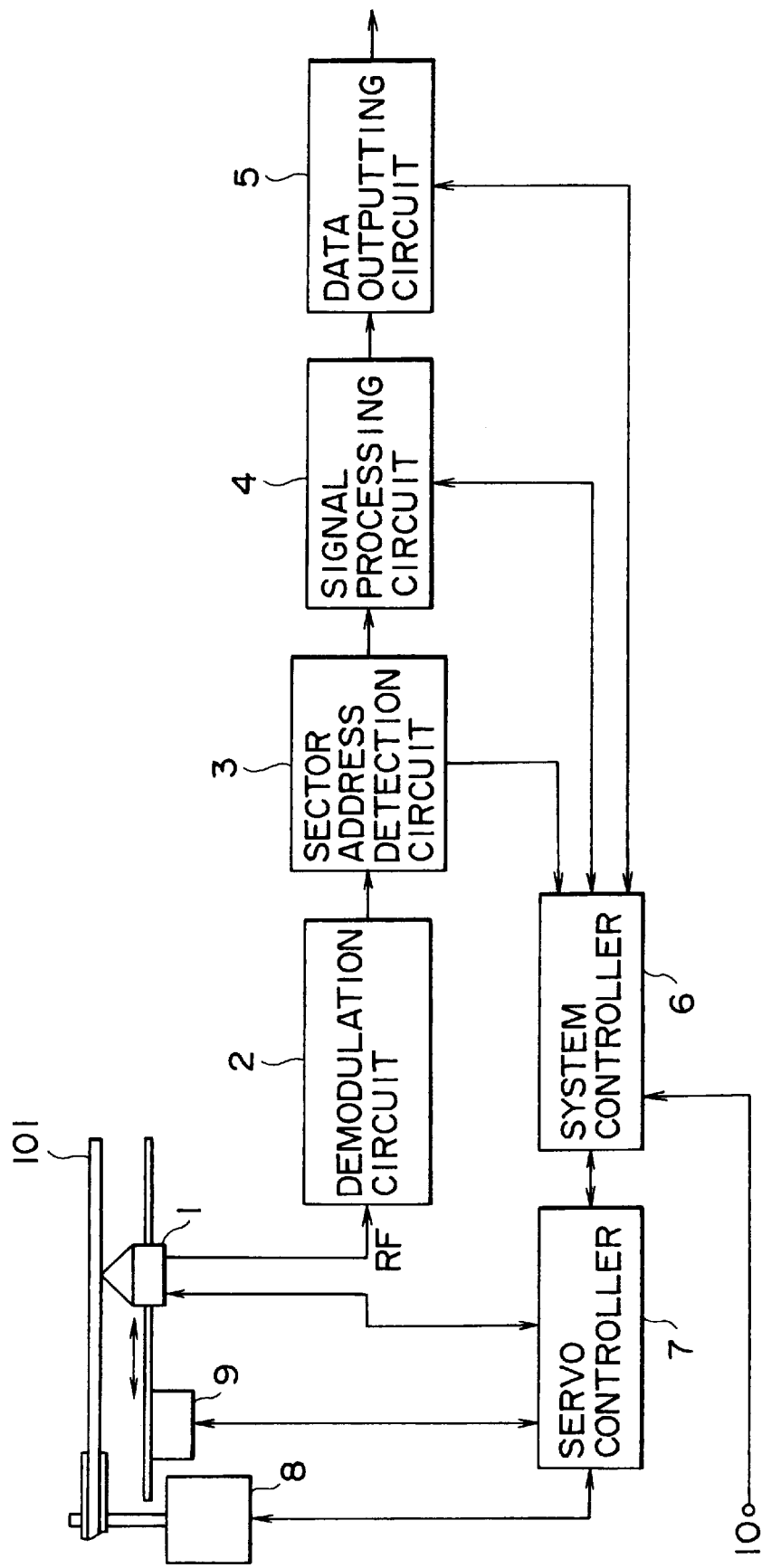
FIG. 1 is a block diagram of a first embodiment of the reproducing apparatus according to the present invention.

The reproducing apparatus of FIG. 1 illustrates a first embodiment of the present invention wherein optical pickup 1 radiates laser light upon a predetermined track of optical disk 101. An objective lens (not shown) focuses the laser light by adjusting the focal distance of optical pickup 1 from optical disk 101 in accordance with a control signal supplied thereto from servo controller 7. Light impinging upon pits of the optical disk is reflected therefrom and coupled through the objective lens to a photodetector which photoelectrically converts the reflected light to an RF signal.

Demodulation circuit 2 binary digitizes the RF signal supplied thereto from optical pickup 1 and performs error correction on the digitized data. The error corrected digital data is then sent to sector address detection circuit 3.

Sector address detection circuit 3 extracts, from the digital data supplied thereto, the current sector address Sc of the current sector being currently read out by optical pickup 1 and couples the current sector address Sc to system controller 6. The remainder of the digital data supplied to sector address detection circuit 3 is forwarded to signal processing circuit 4.

Signal processing circuit 4 performs predetermined processing on the digital data supplied thereto and couples the processed data to data outputting circuit 5. Signal processing circuit 4, for example, decompresses the digital data which is compressed according to a compression standard such as MPEG-2. In the case where multiplexed data is recorded on the optical disk, signal processing circuit 4 selects from among the multiplexed data in response to a predetermined setting and sends the sector address of the selected data to system controller 6.

Data outputting circuit 5, under the control of system controller 6, couples the data supplied thereto from signal processing circuit 4 to a predetermined circuit (not shown) for further processing. For example, the output data may be coupled to an MPEG-2 decoder for decoding in preparation for display.

Meanwhile, system controller 6 causes servo controller 7 to control drive systems such as spindle motor 8 and head drive motor 9 to track the optical pickup to the current sector in response to the current sector address Sc supplied from sector address detection circuit 3 according to user commands such as <play> or <stop> supplied thereto from input 10. More particularly, servo controller 7 controls spindle motor 8 to rotate optical disk 101 so that the linear velocity at the reading out position corresponds to the sampling rate of the optical pickup. The sampling rate is determined from a clock signal recorded at the beginning of the optical disk in the area known as the Table of Contents (TOC) area. Motor 9 is controlled so that optical pickup 1 is driven to and disposed at the reading out position determined by system controller 6. Further, servo controller 7 controls an actuator (not shown) to effect tracking servoing of optical pickup 1.

Figure 2:
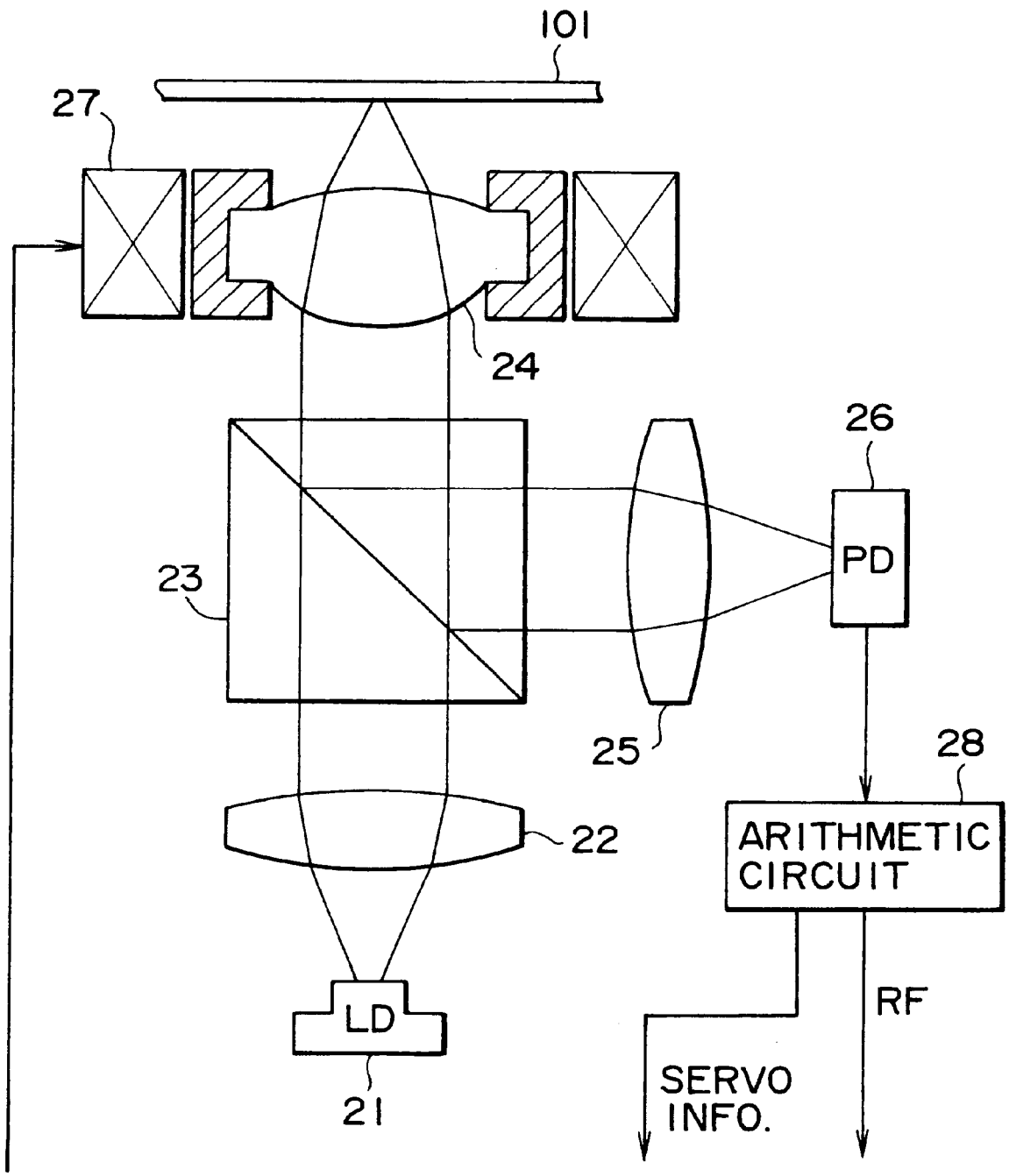
FIG. 2 is an illustration of the optical pickup.

FIG. 2 illustrates a construction of optical pickup 1. Of course, other suitable constructions of the optical pickup may be implemented in the present invention.

Laser diode (LD) 21 generates laser light of a predetermined wave length and directs the laser light to collimator lens 22. Collimator lens 22 collimates the laser light incident thereto from the laser diode into a parallel light beam which is directed to beam splitter (BS) 23.

Beam splitter 23 directs the parallel light beam incident thereon from collimator lens 22 to objective lens 24. Focusing actuator 27, under the control of servo controller 7 (FIG. 1), causes objective lens 24 to focus the light from beam splitter 23 onto optical disk 101 by adjustment of the distance of objective lens 24 from optical disk 101. Light reflected from optical disk 101 and coupled to beam splitter 23 by objective lens 24 is re-directed to another collimator lens 25 which converges the reflected light onto photodetector 26. A light reception element of photodetector 26 having a predetermined shape receives the light reflected from optical disk 101 and photo-electrically converts the reflected light to an electrical signal.

Arithmetic circuit 28 processes the electric signal supplied thereto from photodetector 26 into either an RF signal or servo information. The RF signal is coupled to demodulation circuit 2 (FIG. 1) whereupon the RF signal is demodulated as described above. The servo information is coupled to servo controller 7 (FIG. 1) which processes the servo information and controls the optical pickup/optical disk accordingly.

Figure 3:
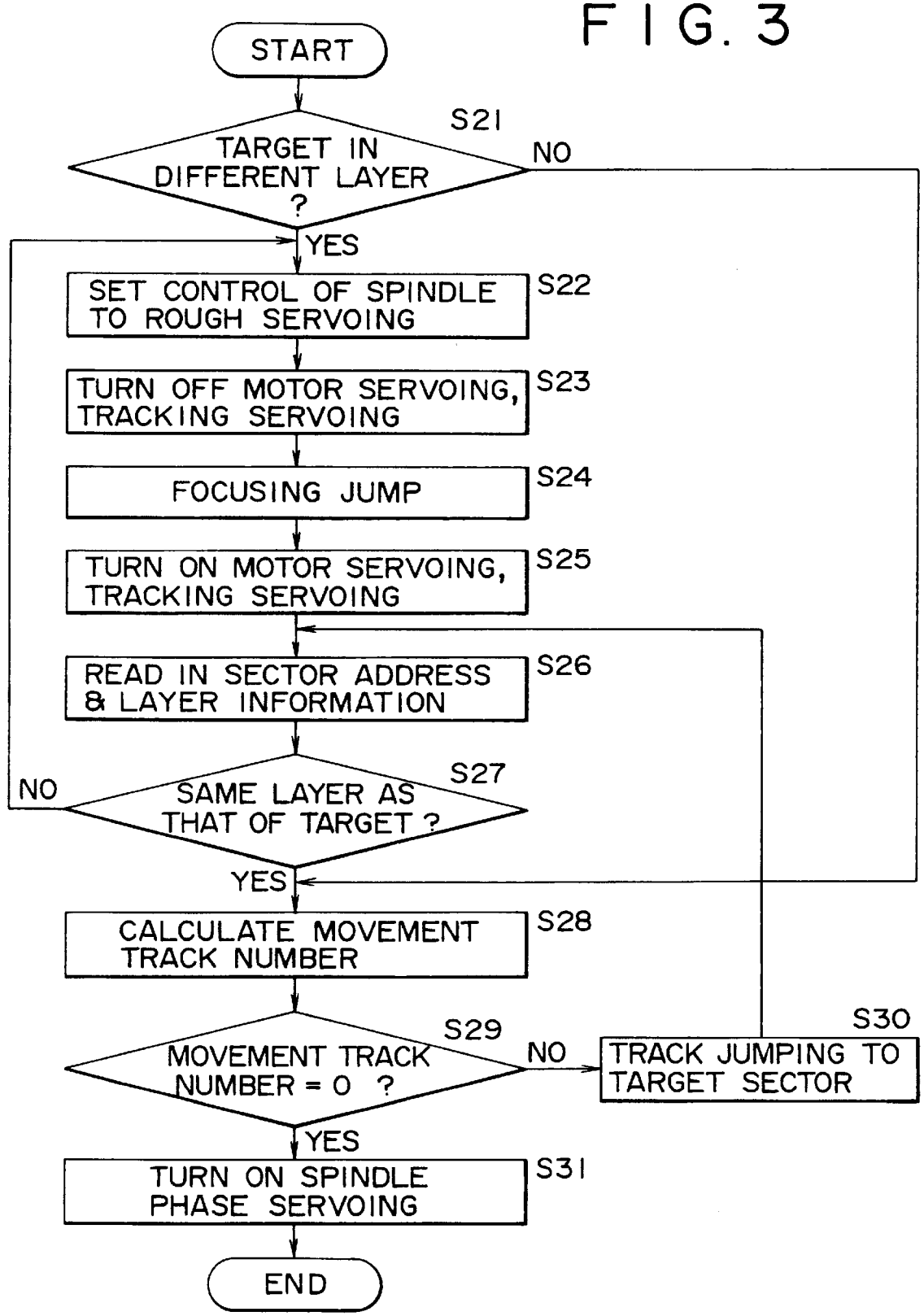
FIG. 3 is a flowchart of the operation of the reproducing apparatus according to the present invention in FIG. 1.

The servo control operation is represented by the flowchart of FIG. 3. Controller 6, in step S21, discriminates, from the target sector address St and the current sector address Sc, whether the target sector is in a recording layer different from the current recording layer.

If so, system controller 6 halts servoing in preparation for refocusing. Thus, system controller 6 controls servo controller 7 in step S22 to set spindle motor 8, which rotates optical disk 101, to rough servoing. Then, system controller 6 in step S23 halts servoing control of thread motor 9 and tracking servoing of optical pickup 1.

Then, system controller 6 commences refocusing by causing servo controller 7 in step S24 to control focusing actuator 27 to change the distance between objective lens 24 of optical pickup 1 and optical disk 101. As shown in FIG. 4, the focusing position of the optical pickup is jumped from the current recording layer (0) to the target recording layer (1).

After the optical pickup is refocused, system controller 6 instructs servo controller 7 in step S25 to resume servoing control of motor 9 and tracking servoing of optical pickup 1. Thus, the present invention immediately resumes servoing of both the head drive motor and the tracking, thereby quickly tracking the optical pickup to the target track of the target recording layer.

System controller 6 then determines in steps S26 and S27 whether refocusing in step S24 was successful. Hence, system controller 6 receives in step S26 the sector address and the layer information reproduced from optical disk 101 recovered by sector address detection circuit 3. Signal processing circuit 4 discriminates in step S27 from the layer information whether the recording layer being currently read includes the target sector. If not, system controller 6 returns control to steps S22 to S27 until the reading out position of the optical pickup is set to the target recording layer. If system controller 6 discriminates in step S27 that the reading out position is indeed set to the recording layer which includes the target sector then it is determined that the optical pickup is focused on the target recording layer and control is advanced to S28.

System controller 6 then commences, for the first time in the present operation, spurt processing in steps S28 to S30 by first calculating the movement track number in step S28 from the target sector address St of the target sector to be read in the target recording layer and the current address Sc of the current sector. In step S29, system controller 6 discriminates whether the movement track number is zero which indicates that the reading out position is set to the target position. Otherwise, servo controller 7 controls thread motor 9 in step S30 to track jump the optical pickup by a number equal to the movement track number. Thereafter, system controller 6 in steps S26 and S27 determines whether the optical pickup remains focused on the target layer. In this manner, track jumping is repeated in steps S26 to S30 until the reading out position is set to the target sector.

After it is determined in step S29 that the reading out position of the optical pickup is set to the target sector, control in FIG. 3 advances to step S31. At this time, system controller 6 causes servo controller 7 to resume servoing control of the phase of spindle motor 8 and processing ends.

It will be appreciated that the present invention performs spurt processing only once (steps S28 to S30), thereby tracking the target sector quickly. The reading out position of the optical pickup, shown schematically in FIG. 5, is refocused from the current recording layer (0) to the target recording layer (1). Next, the reading out position of the optical pickup is track jumped according to spurt processing along the target recording layer (1) to the target position corresponding to the target track and the operation is complete.

The second embodiment of the present invention is particularly directed to reproducing a dual layer DVD wherein addresses of one of the dual recording layers are allocated in an "opposite track path", for example, from the outer circumference toward the inner circumference. This is opposite to the track path of a single layer DVD wherein the addresses are allocated from the inner circumference to the outer circumference. It will be appreciated that DVDs having an opposite track path are useful when reproducing continuous data, such as a movie, because the beginning address of the target recording layer is quickly calculated by inverting the bits of the last address of the current recording layer.

Figure 6A:
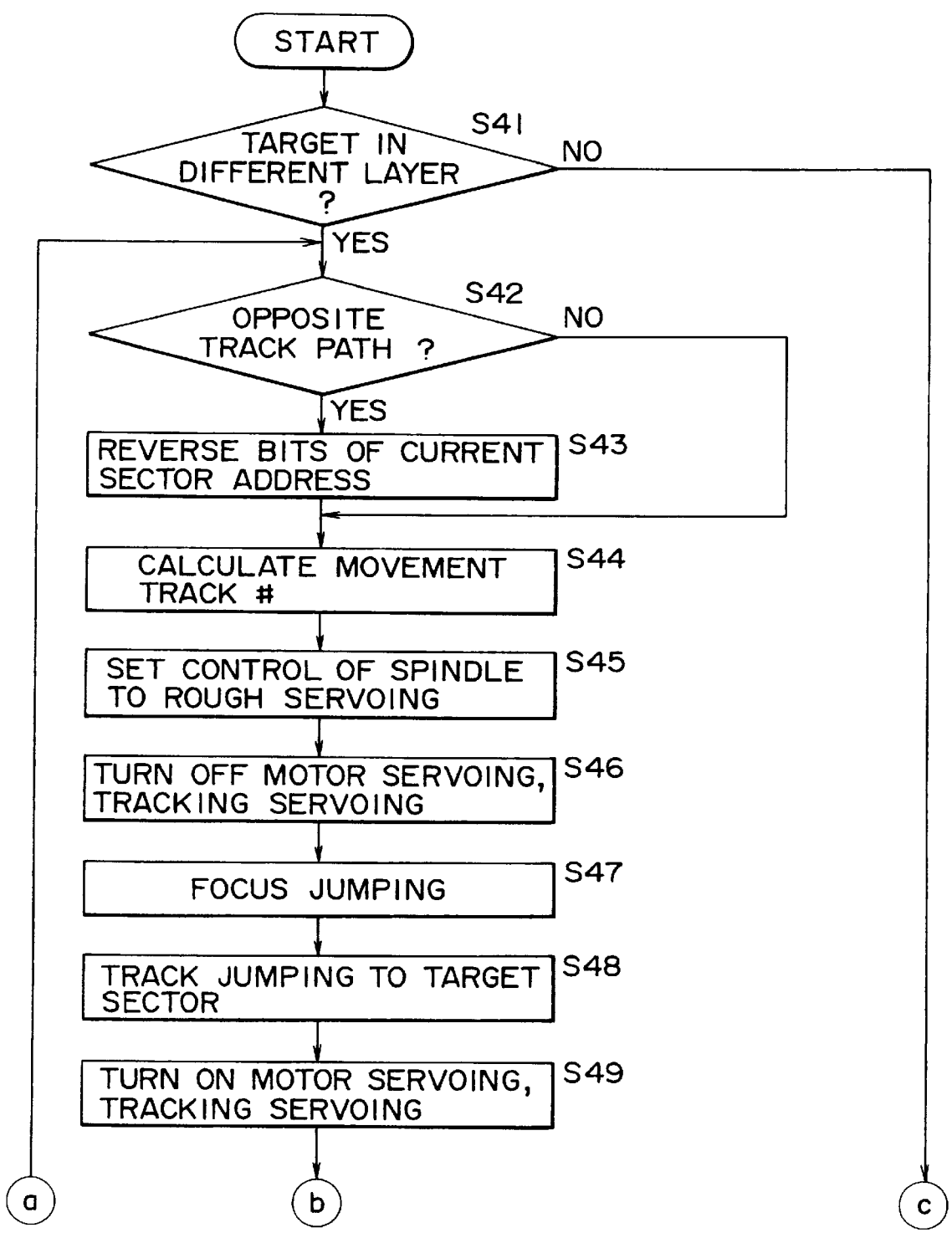
FIG. 6 is a flowchart of the operation of a second embodiment of the present invention.
Figure 6B:
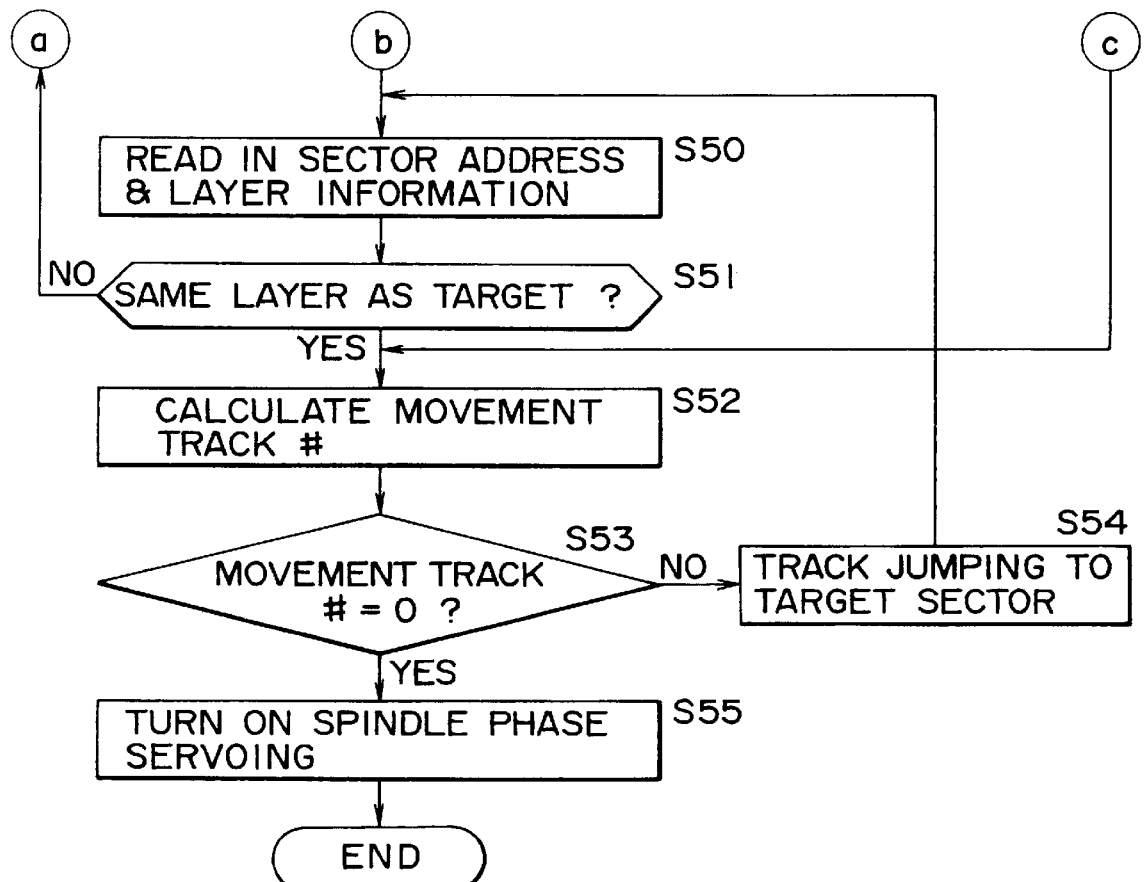
Figure 6:
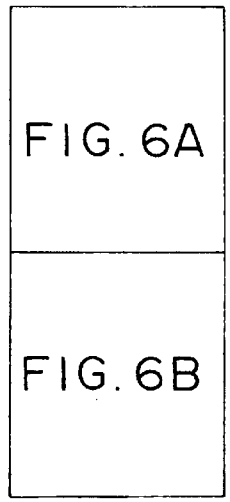
Figure 8:
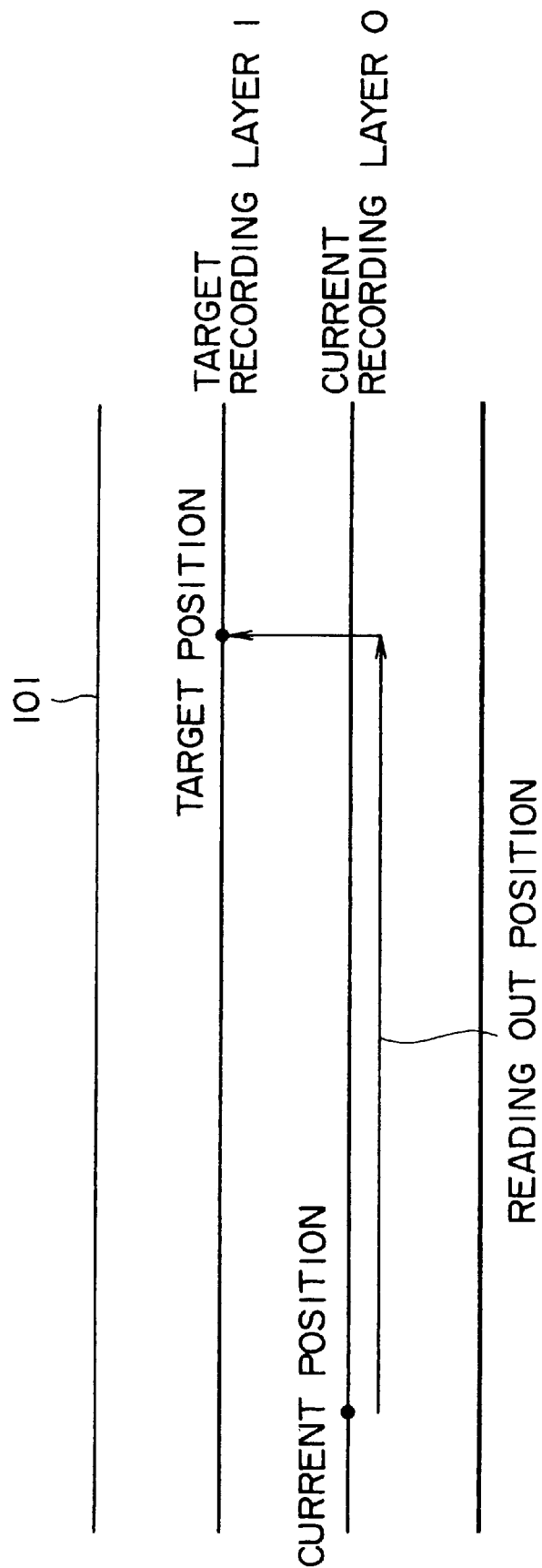
FIG. 8 illustrates the movement of the optical pickup according to the operation in FIG. 7.

The second embodiment of the present invention relates to the reproduction apparatus shown in FIG. 1 and a discussion of FIG. 1 is referred to in the foregoing description. The operation of the reproduction apparatus of FIG. 1 according to the second embodiment is represented by the flowchart shown in FIG. 6; and system controller 6 discriminates in step S41, from the target sector address St of the target sector to be read and the current sector address Sc of the current sector, whether the target sector is in a recording layer different from the current recording layer. If so, control is advanced to steps S42 to S51 to refocus the reading out position of the optical pickup to the target recording layer.

System controller 6 discriminates in step S42, from the current address Sc of the current sector, whether the current recording layer has an opposite track path (addresses allocated from the outer circumference to the inner circumference). If so, system controller 6 calculates in step S43 an address having bits reverse to the address Sc of the current sector. In the preferred embodiment, the "reversed" address points to the target sector in the target recording layer. On the other hand, if system controller 6 discriminates in step S42 that the current recording layer does not have an opposite track path, then the step of reversing the bits of the current sector address is skipped and control is advanced to step S44.

In step S44, system controller 6 calculates, from the target sector address St of the target sector and the current sector address Sc of the current sector, the movement track number over which the reading out position of optical pickup 1 is to be moved.

Then, system controller 6 prepares for refocusing by halting servoing control. In step S45, servo controller 7 sets control of the spindle motor to rough servoing in order to fix the linear velocity of the optical disk. In step S46, servo controller 7 halts servoing control of drive motor 9 and tracking servoing of optical pickup 1.

System controller 6 then commences refocusing by instructing servo controller 7 in step S47 to vary the distance between objective lens 24 of optical pickup 1 and optical disk 101 as shown in FIG. 4. Consequently, the focus position of the optical pickup is jumped to the target layer and refocusing is complete.

In step S48, system controller 6 controls servo controller 7 to control the motor 9 so that the optical pickup is track jumped by the movement track number calculated in step S44 while drive motor servoing and tracking servoing remain halted. Once the reading out position of the optical pickup is track jumped to the target track, system controller 6 in step S49 instructs servo controller 7 to resume servoing control of motor 9 and tracking servoing of optical pickup 1.

Thereafter, system controller 6 in step S50 receives the sector address and the layer information reproduced from optical disk 101 as determined by sector address detection circuit 3 and signal processing circuit 4. In step S51, system controller 6 discriminates from the layer information whether the recording layer jumped to in step S47 includes the target sector. If not, system controller 6 determines that the refocusing in step S47 was unsuccessful and returns control to step S42 to repeat refocusing in steps S42 to S51 until the recording out position of the optical pickup is set to the target recording layer.

If the refocusing in step S47 was successful, control is advanced to step S52. Meanwhile, if system controller 6 discriminates in step S41 that the current reading out position of the optical pickup is already set to the target recording layer then it is determined that refocusing is not necessary and control is advanced directly to step S52, thereby skipping steps S42 to S51.

In steps S52 to S54, system controller 6 initiates spurt processing for the first time in the described operation to track the optical pickup to the target track. Thus, system controller 6 calculates in step S52 the movement track number from the target sector address St of the target sector to be read in the target recording layer and the current sector address Sc of the current sector. In step S53, system controller 6 discriminates whether the movement track number is 0 which indicates that the reading out position of the optical pickup is set to the target sector. If not, system controller 6 controls servo controller 7 in step S54 to control motor 9 to track jump the reading out position of the optical pickup by the movement track number.

Thereafter, system controller 6 returns control to step S50 and again determines the sector address and the layer information. In step S51, system controller 6 determines whether the optical pickup remains focused on the target recording layer. In this manner, track jumping is repeated in steps S50 to S54 until the reading out position is moved to the target sector.

Once the reading out position of the optical pickup is set to the target sector, system controller 6 advances control to step S55. At this time, servo controller 7 resumes servoing control of the phase of spindle motor 8 and the operation depicted in FIG. 6 ends.

Movement of the reading out position of the optical pickup is thus performed according to the second embodiment in the manner described above. It will be appreciated that refocusing in step S47 and track jumping in step S48 are performed while drive motor servoing and tracking servoing are halted. Thus, spurt processing occurs only once in steps S50 to S54 in the second embodiment.

The foregoing-described embodiments are not limited to the DVD of the dual layer type, but are equally applicable to optical disks of different formats. Further, while the foregoing described embodiments reproduce data from optical disks of two recording layers, the present invention may be similarly applied to optical disks of three or more recording layers.

The reproduction apparatus of the present invention, when a track to be read out next is in a different recording layer, moves the reading out position of the optical pickup to the recording layer which has the track to be read out next. With the present invention, movement of the reading out position of the optical pickup to the different recording layer can be performed in a short time.

I claim:

1. A reproducing method for reproducing data from a disk on which a plurality of recording layers of data recorded thereon are read from one face, wherein said data is arranged in each recording layer in sectors along circumferential tracks of said disk the method comprising the steps of:

reading from a reading out position said data recorded in a first recording layer of said disk;

refocusing said reading out position from said first recording layer to a second recording layer which includes data to be read next;

moving said reading out position along said second recording layer to a position where said data is to be read next to effect spurt processing; along said second recording layer to said position where said data is to be read next;

calculating a movement track number corresponding to the number of tracks said reading out position must be moved along said second recording layer to said position where said data is to be read next;

determining whether said movement track number is equal to 0; and track jumping said tracks of said disk by said movement track number when it is determined that said movement track number is not equal to 0.

2. The method according to claim 1, further comprising the step of determining whether said reading out position is in said first recording layer or said second recording layer.

3. The method according to claim 1, further comprising the step of determining whether said reading out position remains in said second recording layer after the step of track jumping.

4. A reproducing method for reproducing data from a disk on which a plurality of recording layers of data recorded thereon are read from one face, wherein said data is arranged in each recording layer in sectors along circumferential tracks of said disk, said method comprising the steps of:

reading from a reading out position said data recorded in a first recording layer of said disk;

refocusing said reading out position from said first recording layer to a second recording layer which includes data to be read next;

moving said reading out position along said second recording layer to a position where said data is to be read next; and wherein the step of reading said data recorded in said first recording layer of said disk comprises determining whether said first recording layer has an opposite track path.

5. The method according to claim 4, wherein each sector contains a plural-bit sector address; and further comprising the step of reversing the bits of a recovered sector address of said reading out position to generate reversed bits upon the determination that said first recording layer has an opposite track path.

6. The method according to claim 5, further comprising the step of calculating, from the reversed bits, a movement track number corresponding to the number of tracks said reading out position must be moved along said second recording layer to said position where said data is to be read next.

7. The method according to claim 6, wherein the reading out position is tracked by controlled servoing; and further comprising the step of halting said controlled servoing during the step of refocusing said reading out position from said first recording layer to a second recording layer.

8. The method according to claim 7, further comprising the step of track jumping said tracks of said disk by said movement track number.

9. The method according to claim 8, wherein the controlled servoing comprises the steps of:

servoing a spindle motor to set a linear velocity of said disk in synchronization with a sampling rate for reproducing said data from said disk;

servoing a drive motor to set said reading out position along said plurality of recording layers; and tracking servoing said reading out position to said disk.

10. The method according to claim 9, further comprising the step of resuming servoing of said drive motor and said tracking servoing upon completion of the step of refocusing said reading out position from said first recording layer to said second recording layer.

11. The method according to claim 10, wherein the step of moving said reading out position along said second recording layer effects spurt processing comprising the steps of:

calculating a movement track number corresponding to the number of tracks said reading out position must be moved along said second recording layer to said position where said data is to be read next;

determining whether said movement track number is equal to 0; and track jumping said tracks of said disk by said movement track number when it is determined that said movement track number is not equal to 0.

12. The method according to claim 11, further comprising the steps of halting said servoing of said spindle motor during said spurt processing and resuming said step of servoing of said spindle motor upon completion of said spurt processing.

13. A reproducing apparatus for re-producing data from an optical disk on which a plurality of recording layers of data recorded thereon are read from one face, wherein said data is arranged in each recording layer in sectors along tracks of said disk, said apparatus comprising:

optical pickup means for reading said data from said disk at a reading out position;

refocusing means coupled to said optical pickup means for refocusing said reading out position of said optical pickup means from a first recording layer to a second recording layer of said disk;

moving means for moving said reading out Position focused on said second recording layer along said second recording layer to a position where said data is to be read next; and control means for controlling by spurt processing said moving means to move said reading out position by calculating a movement track number corresponding to the number of tracks said moving means must move said reading out position to the position where said data is to be read next, determining if said movement track number is equal to 0, and causing said moving means to move said reading out position of said optical pickup by said movement track number when said movement track number does not equal 0.

14. The apparatus according to claim 13, further comprising servoing means for servoing said reading out position of said optical pickup to the disk.

15. The apparatus according to claim 14, wherein said system control means causes said servoing means to halt servoing during refocusing by said refocusing means.

16. The apparatus according to claim 14, wherein said optical pickup means reads data from a dual layer DVD.

17. The apparatus according to claim 13, wherein said system control means controls said moving means by spurt processing only after said refocusing means refocuses said reading out position of said optical pickup means.

18. A reproducing apparatus for reproducing data from an optical disk on which a plurality of recording layers of data are read from one face, wherein said data is arranged in each recording layer in sectors along tracks of said disk, said apparatus comprising:

an optical pickup that reads said data from said disk at a reading out position;

a focusing actuator coupled to said optical pickup that refocuses said reading out position of said optical pickup from a first recording layer to a second recording layer of said disk;

a driver that moves said reading out position focused on said second recording layer along said second recording layer to a position where said data is to be read next; and a system controller that controls by spurt processing said driver to move said reading out position by calculating a movement track number corresponding to the number of tracks said driver must move said reading out position to the position where said data is to be read next, determining if said movement track number is equal to 0, and causing said driver to move said reading out position of said optical pickup by said movement track number when said movement track number does not equal 0.

19. The apparatus according to claim 18, further comprising a servo controller that servo controls said optical pickup.

20. The apparatus according to claim 19, wherein said system controller causes said servo controller to halt servoing during refocusing by said focusing actuator.

21. The apparatus according to claim 20, wherein said optical pickup reads data from a dual layer DVD.

22. The apparatus according to claim 18, wherein said system controller controls said driver by spurt processing only after said focusing actuator refocuses said reading out position of said optical pickup.

* * * * *